(12) United States Patent
Hirata (10) Patent No.: US 8,437,944 B2
(45) Date of Patent: May 7, 2013

(54) FUEL INJECTION DEVICE OF INTERNAL COMBUSTION ENGINE

(75) Inventor: Yasuo Hirata, Chita-gun (JP)

(73) Assignee: Denso Corporation, Kariya (JP)

( * ) Notice: Subject to any disclaimer, the term of this patent is extended or adjusted under 35 U.S.C. 154(b) by 527 days.

(21) Appl. No.: 12/843,250

(22) Filed: Jul. 26, 2010

(65) Prior Publication Data

US 2011/0060515 A1 Mar. 10, 2011

(30) Foreign Application Priority Data

Sep. 4, 2009 (JP) ................................. 2009-204966

(51) Int. Cl.
*G06F 7/00* (2006.01)
*G06F 7/02* (2006.01)

(52) U.S. Cl.
USPC .......................................... 701/104; 123/299

(58) Field of Classification Search ................... 701/103, 701/104, 106; 123/295, 299, 300, 304, 674, 123/681, 478

See application file for complete search history.

(56) References Cited

U.S. PATENT DOCUMENTS 6,244,241 B1 * 6/2001 Mamiya et al. ............... 123/295
2008/0103675 A1 * 5/2008 Ishizuka et al. ............... 701/103

FOREIGN PATENT DOCUMENTS

JP 07-119507 5/1995
JP 2006-170165 6/2006

* cited by examiner

*Primary Examiner* — Mahmoud Gimie
(74) *Attorney, Agent, or Firm* — Nixon & Vanderhye PC (57) ABSTRACT

A learning value for correcting a basic injection pulse such that an actual air-fuel ratio approximates to a target air-fuel ratio is calculated individually for each injection time number, which is decided according to an operation state of an engine. Thus, even if the number of occurrence(s) of invalid injection time changes with the injection time number and the invalid injection time changes with time, the appropriate learning value can be calculated for each injection time number. If injection from an injector is performed according to an injection pulse corrected with the learning value, the change of the invalid injection time can be absorbed and accuracy of a fuel injection quantity can be improved.

5 Claims, 5 Drawing Sheets

FUEL INJECTION DEVICE OF INTERNAL COMBUSTION ENGINE

CROSS REFERENCE TO RELATED APPLICATION

This application is based on and incorporates herein by reference Japanese Patent Application No. 2009-204966 filed on Sep. 4, 2009.

BACKGROUND OF THE INVENTION

1. Field of the Invention

The present invention relates to a fuel injection device of an internal combustion engine capable of varying the time number of fuel injection(s) performed by an injector according to an operation state of the internal combustion engine.

2. Description of Related Art

A fuel injection device of an internal combustion engine capable of varying the time number of fuel injection(s) according to an operation state of the internal combustion engine is described in Patent document 1 (JP-A-H7-119507), for example.

The fuel injection device of Patent document 1 is applied to a direct-injection engine that injects the fuel directly into a combustion chamber. The fuel injection device starts the fuel injection from a latter half of a compression stroke to perform stratified charge combustion when an engine load is low. The fuel injection device starts the fuel injection from a former half of an intake stroke to perform homogenous combustion when the engine load is high.

In the stratified charge combustion performed when the engine load is low, the fuel is injected only once from the latter half of the compression stroke, whereby a mixture gas having a concentration providing suitable ignitability is formed near an ignition plug. When an operation state of the engine is in a low-rotation operation range where the homogenous combustion is performed, i.e., when the operation state is a high-load low-speed operation state, the fuel is injected via multiple times of divided injections, which are performed from the former half of the intake stroke. Accordingly, the fuel injection quantity injected per each injection decreases. As a result, the fuel is atomized and diffused effectively and a homogeneous mixture gas is formed in the combustion chamber.

The fuel injection device usually has a booster circuit for generating a high voltage from a battery voltage to drive the injector. The generated high voltage is temporarily stored in a charge capacitor. The high voltage is applied to the injector through a switching element from fuel injection start timing to fuel injection stop timing. Thus, a quantity of the fuel corresponding to the applying time of the high voltage is injected from the injector.

The injector has a delay since the high voltage is applied to the injector until an injection hole actually opens and the injection is started. The delay is an invalid injection time, in which the fuel is not injected from the injector although the high voltage is applied to the injector.

If a driving time of the injector equivalent to a necessary fuel injection quantity is simply divided by the injection time number and the injector is driven as in the above-described fuel injection device, accuracy of the fuel injection quantity deteriorates because the number of occurrence(s) of the invalid injection time differs between the one-time injection and the two or more times of injections. As a countermeasure, correction can be performed to lengthen the driving time of the injector by a predetermined invalid injection time in accordance with the injection time number.

However, if the injection by the injector is divided into two or more times of the injections, the divided injections are performed at extremely short time intervals. Therefore, the injector is driven while continuously consuming the high voltage stored in the charge capacitor. That is, the injector is driven by the high voltage stored in the charge capacitor in the first injection. However, in the second or later injection, the voltage has been consumed by the preceding injection(s), so the injector is driven by the voltage having lowered from the initial high voltage.

The invalid injection time mentioned above changes with the level of the voltage applied to the injector. Therefore, length of the invalid injection time differs between the first injection and the second or later injection. The invalid injection time of the second or later injection is longer than the invalid injection time of the first injection. Moreover, it is thought that the invalid injection time of each injection time number changes with time due to degradation of the charge capacitor and the like. Therefore, even if the driving time of the injector is corrected by the predetermined invalid injection time according to the injection time number, it is difficult to sufficiently improve the accuracy of the fuel injection quantity.

SUMMARY OF THE INVENTION

It is an object of the present invention to sufficiently improve accuracy of a fuel injection quantity of a fuel injection device of an internal combustion engine capable of varying a fuel injection time number of an injector according to an operation state of the internal combustion engine.

According to a first example aspect of the present invention, a fuel injection device of an internal combustion engine has a booster circuit, an injector, an air-fuel ratio sensor, an operation state sensing section, a fuel quantity calculating section, an injection time number deciding section, a learning value calculating section, and a controlling section.

The booster circuit boosts a voltage of a battery mounted in a vehicle and stores the boosted voltage in a charge capacitor temporarily.

The injector is driven by the boosted voltage, which is stored in the charge capacitor and is applied to the injector, for injecting fuel into a combustion chamber of the internal combustion engine.

The air-fuel ratio sensor is provided to an exhaust pipe of the internal combustion engine for measuring an actual air-fuel ratio.

The operation state sensing section senses an operation state of the internal combustion engine.

The fuel quantity calculating section calculates a basic fuel quantity to be injected from the injector such that the air-fuel ratio in the internal combustion engine coincides with a target air-fuel ratio according to a sensing result of the operation state sensing section.

The injection time number deciding section decides whether to perform one-time injection or to perform multiple times of divided injections based on the sensing result of the operation state sensing section when the fuel is injected to the internal combustion engine.

The learning value calculating section calculates a learning value for correcting the basic fuel quantity individually for each injection time number decided by the injection time number deciding section such that the actual air-fuel ratio approximates to the target air-fuel ratio based on the actual air-fuel ratio sensed with the air-fuel ratio sensor and the target air-fuel ratio.

The controlling section calculates a corrected fuel quantity by correcting the basic fuel quantity, which is calculated by the fuel quantity calculating section, with a learning value corresponding to the injection time number decided by the injection time number deciding section. The controlling section drives and controls the injector according to the injection time number decided by the injection time number deciding section such that the corrected fuel quantity is injected from the injector.

According to the above-described aspect of the present invention, the learning value for correcting the basic fuel quantity such that the actual air-fuel ratio approximates to the target air-fuel ratio is calculated individually for each injection time number decided by the injection time number deciding section. That is, different learning values are calculated for different injection time numbers. Then, the corrected fuel quantity is calculated by correcting the basic fuel quantity by using the learning value, which corresponds to the injection time number decided based on the operation state of the internal combustion engine. The corrected fuel quantity is injected by the injector. Therefore, even if the occurrence number (i.e., number of occurrence(s)) of the invalid injection time changes with the injection time number and the invalid injection time changes with time, the change of the invalid injection time can be absorbed and accuracy of the fuel injection quantity can be improved by calculating the appropriate learning value through the learning and by performing the injection of the corrected fuel quantity corrected with the learning value.

According to a second example aspect of the present invention, the fuel injection device further has an air-fuel ratio feedback controlling section for performing air-fuel ratio feedback control for conforming the actual air-fuel ratio in the internal combustion engine to the target air-fuel ratio. The learning value calculating section calculates the learning value by using a feedback correction amount at the time when the air-fuel ratio feedback control is performed by the air-fuel ratio feedback controlling section.

When the invalid injection time changes, the actual fuel injection quantity deviates from a target fuel injection quantity. The deviation of the fuel injection quantity is reflected in a difference between the target air-fuel ratio and the actual air-fuel ratio. Therefore, the corrected fuel quantity calculated with the use of the learning value can absorb the change of the invalid injection time by calculating the learning value with the use of the feedback correction amount, which is for compensating the difference between the target air-fuel ratio and the actual air-fuel ratio, when the air-fuel ratio feedback control is performed.

According to a third example aspect of the present invention, the learning value calculating section calculates an average value of the feedback correction amount of the air-fuel ratio feedback control performed while the injection time number decided by the injection time number deciding section is unchanged as the learning value. Thus, an error in the learning value can be reduced.

According to a fourth example aspect of the present invention, the fuel injection device further has an air-fuel ratio feedback controlling section for performing air-fuel ratio feedback control for conforming the actual air-fuel ratio of the internal combustion engine to the target air-fuel ratio. The learning value calculating section calculates the learning value by using a deviation of the fuel quantity from the basic fuel quantity at the time when the air-fuel ratio feedback control is performed by the air-fuel ratio feedback controlling section.

The fuel quantity at the time when the air-fuel ratio feedback control is performed is obtained by adding a feedback correction amount, which is for conforming the actual air-fuel ratio to the target air-fuel ratio, to the basic fuel quantity. When the fuel quantity differs from the basic fuel quantity, it can be regarded that the fuel deviation is caused by the change in the invalid injection time. Therefore, if the learning value is calculated by using the invalid injection time and the driving time of the injector is increased or decreased by the calculated learning value, the fuel injection absorbing the change of the invalid injection time can be performed.

According to a fifth example aspect of the present invention, the learning value calculating section calculates an average value of the deviation of the fuel quantity from the basic fuel quantity at the time when the air-fuel ratio feedback control is performed while the injection time number decided by the injection time number deciding section is unchanged as the learning value.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

First Embodiment

Hereafter, a fuel injection device of an internal combustion engine according to a first embodiment of the present invention will be explained with reference to the drawings.

Figure 1:
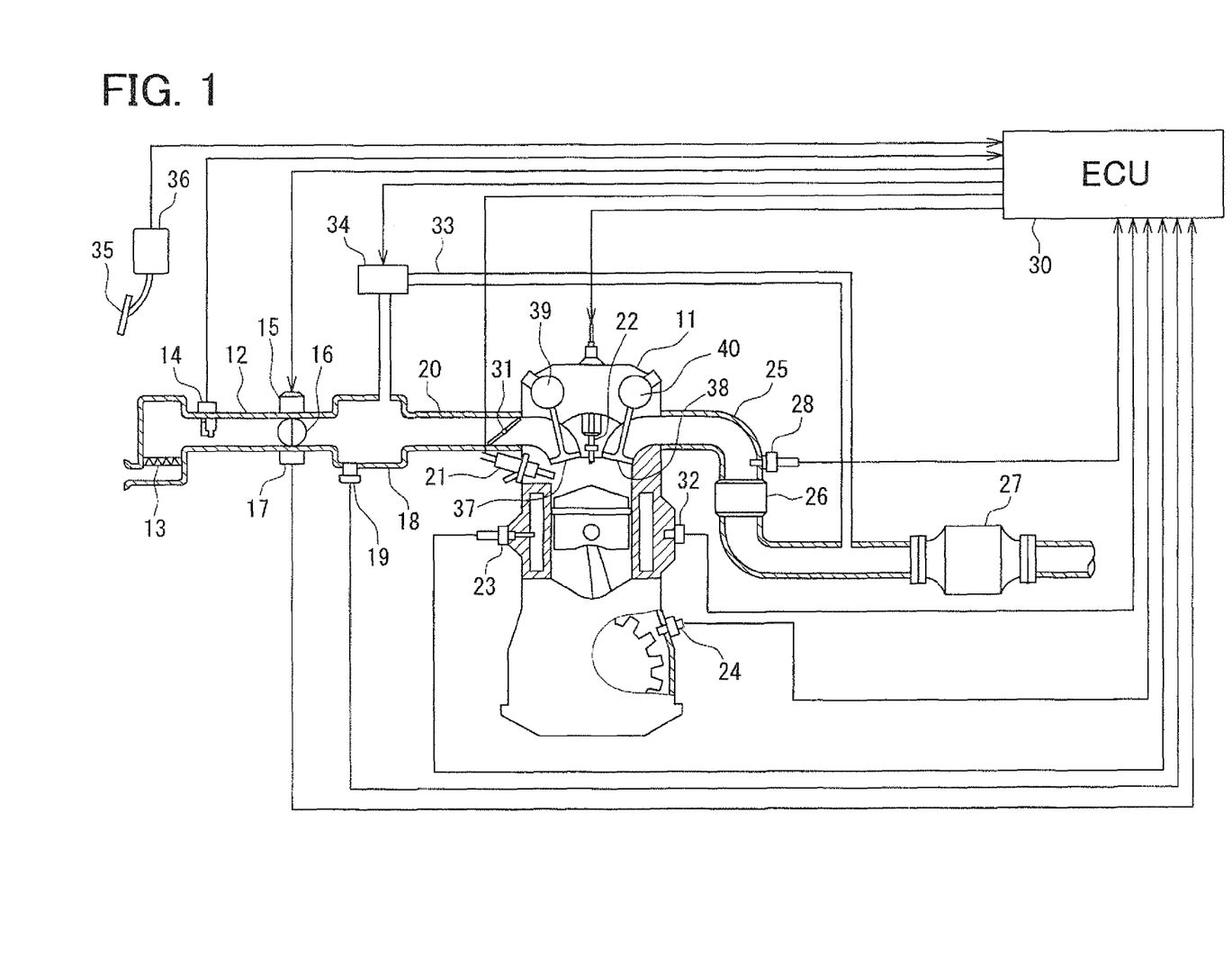
FIG. 1 is a schematic diagram showing an entire construction of an internal combustion engine control system including a fuel injection device according to a first embodiment of the present invention.

FIG. 1 is a schematic diagram showing an entire construction of an internal combustion engine control system including a fuel injection device according to the present embodiment. As shown in FIG. 1, an air cleaner 13 is provided in the most upstream portion of an intake pipe 12 of a direct-injection engine 11, which is an internal combustion engine injecting fuel directly into a cylinder. An airflow meter 14 that senses an intake air quantity is provided downstream of the air cleaner 13. A throttle valve 16, whose opening degree is regulated by a motor 15, and a throttle position sensor 17 for sensing the opening degree of the throttle valve 16 (throttle opening degree) are provided downstream of the airflow meter 14.

A surge tank 18 is provided downstream of the throttle valve 16. An intake pipe pressure sensor 19 for sensing intake pipe pressure is provided to the surge tank 18. An intake manifold 20 for introducing the air into each cylinder of the engine 11 is provided to the surge tank 18. An airflow control valve 31 for controlling airflow intensity in the cylinder (such as swirl flow intensity and tumble flow intensity) is provided in the intake manifold 20 of each cylinder.

An injector 21 for injecting the fuel directly into the cylinder (combustion chamber) is attached to an upper portion of each cylinder of the engine 11. A spark plug 22 is fixed to a cylinder head of the engine 11 for each cylinder. A mixture gas in the cylinder is ignited by a spark discharge of each spark plug 22. Variable valve timing devices 39, 40 are provided to an intake valve 37 and an exhaust valve 38 of the engine 11 respectively. The variable valve timing devices 39, 40 vary opening-closing timings of the valves 37, 38 respectively.

A knock sensor 32 for sensing knocking and a coolant temperature sensor 23 for sensing coolant temperature are fixed to the cylinder block of the engine 11. A crank angle sensor 24 that outputs a pulse signal every time a crankshaft (not shown) rotates by a predetermined crank angle is provided near an outer peripheral side of the crankshaft. The crank angle and engine rotation speed are sensed based on the output signal of the crank angle sensor 24.

An upstream catalyst 26 and a downstream catalyst 27 for purifying exhaust gas are provided to an exhaust pipe 25 of the engine 11. An exhaust gas sensors 28 (such as air-fuel ratio sensor or oxygen sensor) for sensing an air-fuel ratio, a rich/lean state or the like of the exhaust gas is provided to the exhaust pipe 25 upstream of the upstream catalyst 26. In the present embodiment, a three-way catalyst for purifying CO, HC, NOx and the like in the exhaust gas at an air-fuel ratio close to the theoretical air-fuel ratio is used as the upstream catalyst 26. A NOx occlusion reduction catalyst is used as the downstream catalyst 27. The NOx occlusion reduction catalyst 27 has a characteristic that the NOx occlusion reduction catalyst 27 occludes NOx in the exhaust gas when the air-fuel ratio of the exhaust gas is lean and the NOx occlusion reduction catalyst 27 reduces, purifies and discharges the occluded NOx when the air-fuel ratio approximates to the theoretical air-fuel ratio or becomes rich.

An EGR pipe 33 for recirculating a part of the exhaust gas to an intake side is connected between a point of the exhaust pipe 25 downstream of the upstream catalyst 26 and the surge tank 18 of the intake pipe 12. An EGR valve 34 for controlling an exhaust gas recirculation quantity (EGR quantity) is provided in the EGR pipe 33. A pressed amount of an accelerator 35 (i.e., accelerator position) is sensed with an accelerator sensor 36.

Outputs of the above-described various sensors are inputted into an engine control unit 30 (ECU). The ECU 30 is constituted mainly by a microcomputer. The ECU 30 executes various kinds of engine control programs stored in incorporated ROM. Thus, the ECU 30 controls a fuel injection quantity, a fuel injection time number and fuel injection timing of the injector 21, ignition timing of the spark plug 22 and the like according to an engine operation state. At that time, the ECU 30 performs air-fuel ratio feedback control for controlling the fuel injection quantity such that the actual air-fuel ratio coincides with a target air-fuel ratio.

Figure 2:
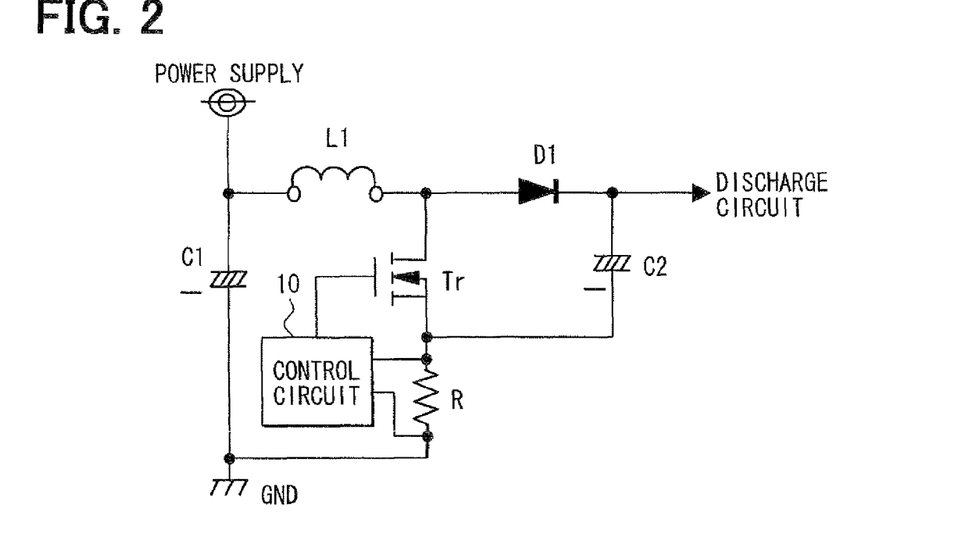
FIG. 2 is a circuit construction diagram showing a booster circuit according to the first embodiment.

The ECU 30 has a booster circuit that generates a high voltage for driving the injector 21. As shown in FIG. 2, the booster circuit has a capacitor C1 connected to a power supply. The capacitor C1 is provided in order to suppress fluctuation of a power supply voltage when a high current flows through the booster circuit consisting of a DC-DC converter.

The booster circuit mainly consists of a charge coil L1, a switching element Tr, a resistance R, a rectifier diode D1, a charge capacitor C2, a control circuit 10 and the like. The voltage boosted by the booster circuit is stored in the charge capacitor C2. If a discharge circuit having a switching element (not shown) is switched on in a state where the high voltage is stored in the charge capacitor C2, the high voltage is applied from the charge capacitor C2 to the injector 21 through the discharge circuit, whereby the high current flows to the injector 21. At that time, the high voltage is applied to the injector 21 from fuel injection start timing to fuel injection stop timing, whereby a quantity of the fuel corresponding to the applying time of the high voltage is injected from the injector 21.

The boosting operation of the booster circuit will be explained below briefly. If the control circuit 10 switches on the switching element Tr, the current flows through the charge coil L1, the switching element Tr and the resistance R. If it is determined that a current value of the current flowing through the resistance R has reached a predetermined value based on a terminal voltage of the resistance R, the control circuit 10 switches off the switching element Tr. Accordingly, a magnetic energy stored in the charge coil L1 by the current having been applied until the switching element Tr is switched off is discharged as an electrical energy, thereby charging the charge capacitor C2 through the rectifier diode D1. The control circuit 10 monitors a voltage of the charge capacitor C2 using a voltage sensing circuit (not shown). The control circuit 10 controls ON/OFF of the switching element Tr such that the voltage of the charge capacitor C2 coincides with a target voltage.

In the present embodiment, when the fuel is injected from the injector 21, the ECU 30 determines whether to perform one-time injection or to perform multiple times of divided injections based on a load and rotation speed of the engine 11. For example, the ECU 30 can decide the time number of the injection(s) according to a map shown in FIG. 3.

Figure 3:
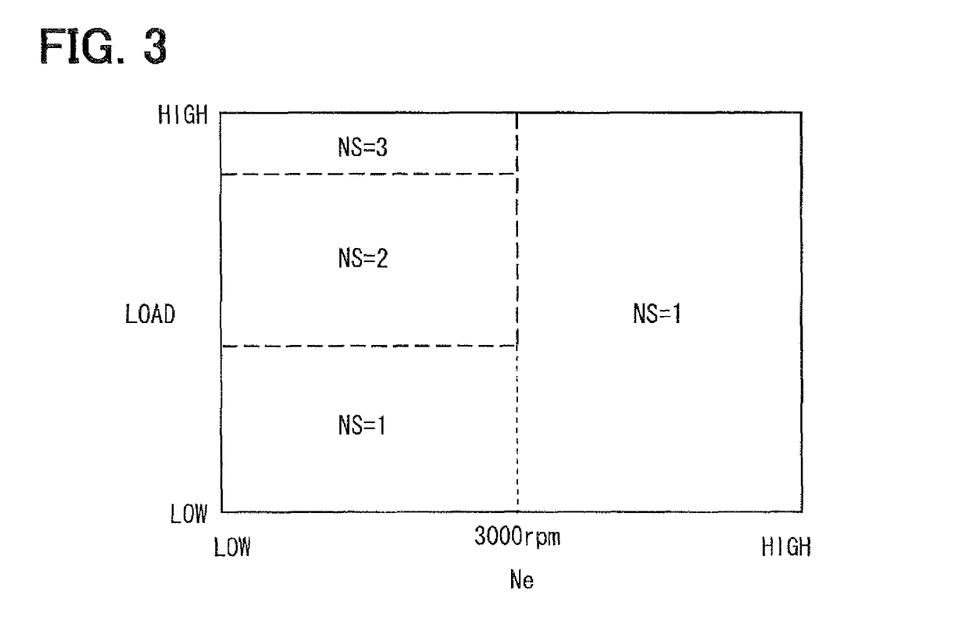
FIG. 3 is a map for deciding a division number of fuel injection according to the first embodiment.

The injection time number NS is decided based on the engine load, which is determined based on the intake pipe pressure, the intake air quantity and the accelerator position, and the engine rotation speed Ne according to the map shown in FIG. 3. More specifically, in the present embodiment, the injection time number NS is set at 1 (NS=1) in a range where the engine rotation speed Ne is relatively high (3000 rpm or over). In such the range, the intake quantity flowing into the combustion chamber of the engine 11 is large, and intake air velocity is high. Accordingly, even if the injection time number NS is 1, unevenness between concentrations of the fuel and the air is less likely to occur and a homogenous mixture gas can be obtained. Therefore, the injection time number NS is set at 1 in such the range. In this case, when the load is low, the fuel injection should be preferably started from (latter half of) a compression stroke in order to perform stratified charge combustion. When the load is high, the fuel injection should be preferably performed from (former half of) an intake stroke in order to perform homogenous combustion.

The injection time number NS is varied according to the load in a range where the engine rotation speed Ne is relatively low (lower than 3000 rpm). More specifically, the injection time number NS is set at 1 (NS=1) when the load is low, the injection time number NS is set at 2 (N=2) when the load is middle, and the injection time number NS is set at 3 (N=3) when the load is high. Necessary fuel injection quantity increases as the load increases. However, in the range where the engine rotation speed Ne is relatively low, the intake quantity flowing into the combustion chamber of the engine 11 is small, and the flow velocity of the intake air is low. Therefore, if a large quantity of the fuel is injected at once, the fuel and the air are not mixed sufficiently, whereby the concentration unevenness tends to occur. Therefore, a division number (i.e., injection time number NS) for dividing the fuel injection is increased as the load increases. Also in this case, the fuel injection timing should be preferably varied such that the stratified charge combustion and the homogenous combustion are switched according to the level of the load.

In the above-described divided injections, the fuel injection quantity is divided such that the fuel quantities of the respective injections are equal to each other. Alternatively, the fuel injection quantities of the respective injections may be decided according to predetermined ratios different from each other.

When the fuel injection time number NS is decided based on the map of FIG. 3 and the decided time number NS of the fuel injections are performed from the injector 21, the high voltage boosted by the above-mentioned booster circuit is applied to the injector 21 to drive the injector 21 regardless of the injection time number NS.

The injector 21 has a delay as an invalid injection time since the high voltage is applied to the injector 21 until the injection hole actually opens and the injector 21 starts the injection. Therefore, the number of occurrence(s) of the invalid injection time is different between the one-time injection and the two or more times of the injections.

Furthermore, when the injection time number NS of the injector 21 is set at 2 or over, the divided injections are performed at extremely short time intervals. Therefore, the injector 21 is driven while continuously consuming the high voltage stored in the charge capacitor C2. That is, the injector 21 is driven with the high voltage stored in the charge capacitor C2 in the first injection. However, in the second or later injection, the voltage having been consumed for the preceding injection(s) and having decreased from the initial high voltage is applied to the injector 21, thereby driving the injector 21. The above-mentioned invalid injection time changes with the level of the voltage applied to the injector 21. Therefore, the length of the invalid injection time of the first injection is different from the length of the invalid injection time of the second or later injection. The invalid injection time of the second or later injection is longer than the invalid injection time of the first injection.

Moreover, if the charge capacitor C2 degrades and a capacitance, a leak current or the like of the charge capacitor C2 changes, the invalid injection time of each injection time number NS changes. That is, it is thought that the invalid injection time changes with time due to the degradation of the charge capacitor C2 and the like.

Therefore, it is necessary to inhibit the lowering of the accuracy of the fuel injection quantity even when the occurrence number (i.e., number of occurrence(s)) of the invalid injection time changes with the injection time number NS and the invalid injection time changes with time. Therefore, in the present embodiment, learning values ADP1-ADP3 for correcting a basic injection pulse TP such that the actual air-fuel ratio approximates to the target air-fuel ratio are calculated individually for the respective decided injection time numbers NS. An injection pulse TAU is calculated by correcting the basic injection pulse TP with the use of the learning values ADP1-ADP3, and the injector 21 is driven with the injection pulse TAU. Thus, the change of the invalid injection time can be absorbed and the accuracy of fuel injection quantity can be improved.

Figure 4:
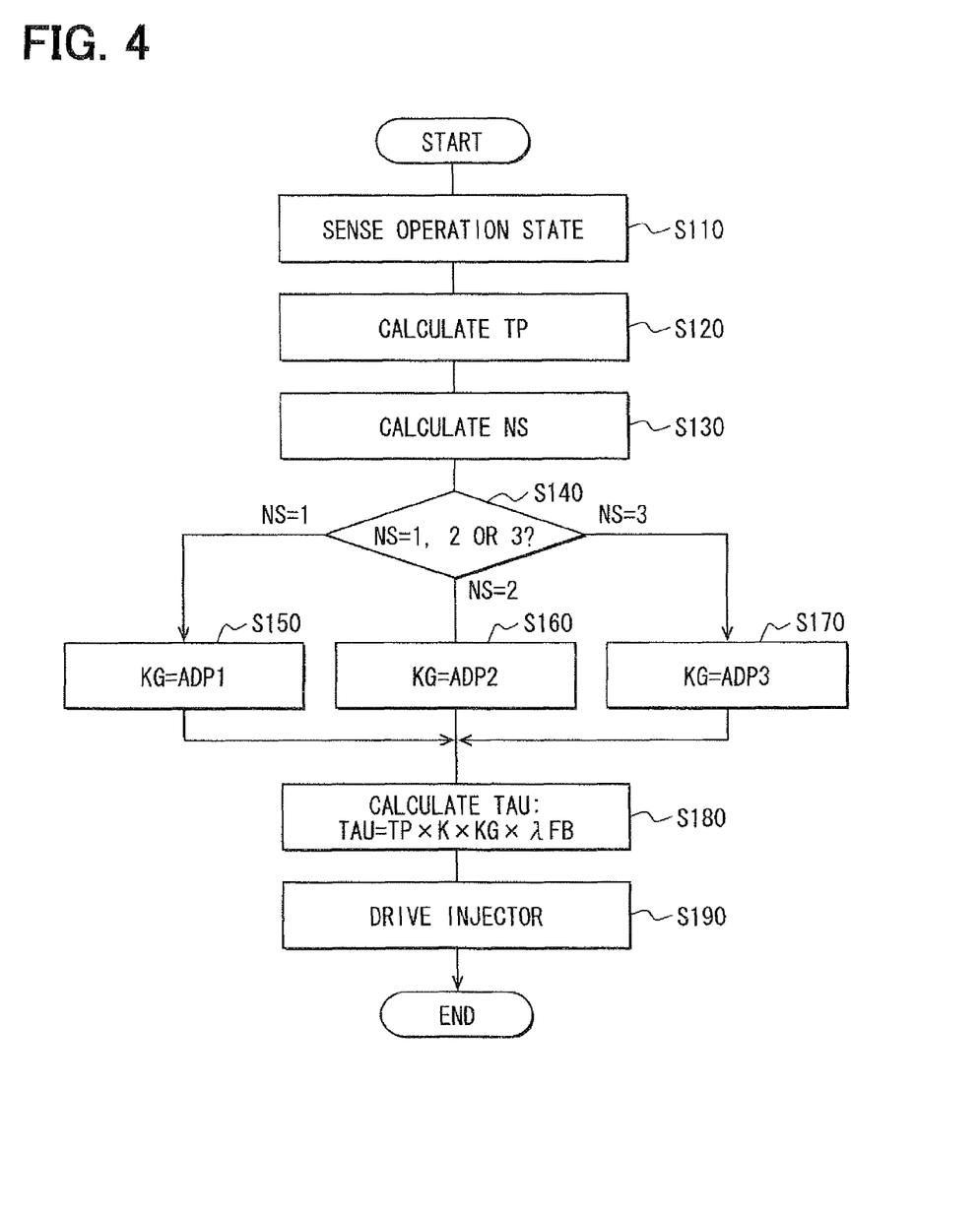
FIG. 4 is a flowchart showing processing for calculating an injection pulse and for driving an injector with the injection pulse according to the first embodiment.
Figure 5:
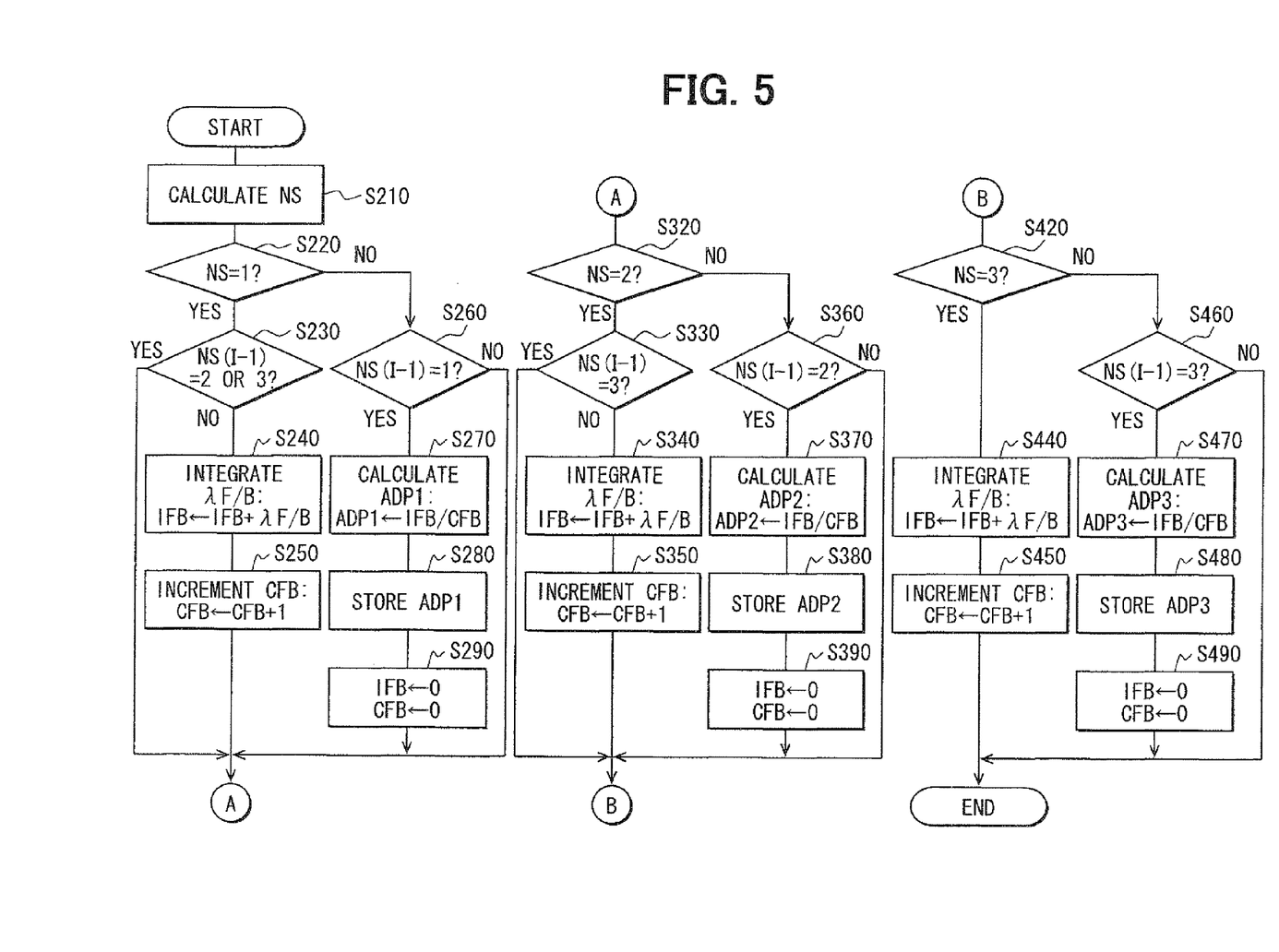
FIG. 5 is a flowchart showing processing for calculating a learning value for each injection division number according to the first embodiment.

Hereafter, fuel injection control processing of the fuel injection device according to the present embodiment will be explained in detail based on flowcharts of FIGS. 4 and 5. FIG. 4 is a flowchart showing processing for calculating the injection pulse TAU for driving the injector 21 and for driving the injector 21 by using the injection pulse TAU. FIG. 5 is a flowchart showing processing for calculating the learning values ADP1-ADP3 for the respective injection time numbers NS.

First, in S110 (S means "Step"), the various sensor outputs indicating the operation state of the engine 11 such as the engine rotation speed Ne, the intake air quantity, the intake pipe pressure, the coolant temperature and the actual air-fuel ratio are sensed. In following S120, the basic injection pulse TP corresponding to a basic fuel injection quantity is calculated based on the operation state of the engine 11 sensed in S110. Thus, in the present embodiment, the fuel injection quantity is calculated as the injection pulse, which is the fuel injection time of the injection from the injector 21.

The basic injection pulse TP is calculated based on the intake air quantity Qa and the engine rotation speed Ne of the engine 11 such that the air-fuel ratio coincides with the target air-fuel ratio (theoretical air-fuel ratio). More specifically, the basic injection pulse TP is calculated by a following formula using a constant k.

$$TP = k \times Qa/Ne$$

The above is an example of the calculation method of the basic injection pulse TP. An other existing calculation method may be used as it is.

In S130, the division number NS (injection time number) at the time when the fuel is injected is calculated from the engine rotation speed Ne and the engine load using the map shown in FIG. 3. In following S140, the division number NS is specified among 1, 2 and 3. When the division number NS (i.e., injection time number) is 1, the process proceeds to S150, in which the learning value ADP1 is substituted for a learning value KG. The learning value ADP1 is calculated as an average value of an air-fuel ratio feedback correction coefficient λFB at the time when the injection time number NS is 1 (as explained later). When the division number NS (i.e., injection time number) is 2, the process proceeds to S160, in which the learning value ADP2 is substituted for the learning value KG. The learning value ADP2 is calculated as an average value of the air-fuel ratio feedback correction coefficient λFB at the time when the injection time number NS is 2. When the division number NS (i.e., injection time number) is 3, the process proceeds to S170, in which the learning value ADP3 is substituted for the learning value KG. The learning value ADP3 is calculated as an average value of the air-fuel ratio feedback correction coefficient λFB at the time when the injection time number NS is 3.

In S180, the injection pulse TAU for driving the injector 21 is calculated. More specifically, the injection pulse TAU is calculated by multiplying the basic injection pulse TP by a correction coefficient K based on the coolant temperature of the engine 11 and the like, the above-mentioned learning value KG and the air-fuel ratio feedback correction coefficient λFB.

The ECU 30 performs the air-fuel ratio feedback control when a predetermined air-fuel ratio feedback condition is satisfied after the engine 11 is started. More specifically, for example, the air-fuel ratio feedback control is performed when all of following conditions (i) to (iv) are satisfied.

Condition (i): Fuel cut for temporarily stopping the fuel supply to the combustion chamber is not performed presently.

Condition (ii): The present load state is not a heavy load state, in which the fuel supply quantity to the combustion chamber is increased temporarily.

Condition (iii): The coolant temperature of the engine 11 is equal to or higher than 0 degree.

Condition (iv): The exhaust gas sensor 28 is in an active state.

When the actual air-fuel ratio sensed with the exhaust gas sensor 28 has deviated from the target air-fuel ratio (theoretical air-fuel ratio), the air-fuel ratio feedback correction coefficient λFB for conforming the actual air-fuel ratio to the target air-fuel ratio is calculated in the air-fuel ratio feedback control. For example, the air-fuel ratio feedback correction coefficient λFB is calculated by adding 1 to a value obtained by dividing a difference between the actual air-fuel ratio and the target air-fuel ratio by the target air-fuel ratio. When the air-fuel ratio feedback condition is not satisfied, the air-fuel ratio feedback correction coefficient λFB is set at 1.

As mentioned above, the fuel injection quantity is increased or decreased by the feedback correction amount by multiplying the basic injection pulse TP by the air-fuel ratio feedback correction coefficient λFB. Thus, the mixture gas introduced into the engine 11 can be maintained near the target air-fuel ratio.

As mentioned above, when the division number NS (injection time number) differs, the occurrence number of the invalid injection time of the injector 21 also differs. Moreover, the invalid injection time of the second or later injection is longer than the invalid injection time of the first injection. Therefore, if the injection pulse TAU is calculated based on the same formula when the division number NS differs, the injection pulse TAU cannot be calculated such that the deviation from the target air-fuel ratio reduces in the cases of all the injection time numbers NS mainly because of the difference in the invalid injection time. Therefore, even if the air-fuel ratio feedback control is performed, there is a possibility that the deviation between the actual air-fuel ratio and the target air-fuel ratio enlarges specifically when the injection time number NS is switched.

Therefore, in the present embodiment, the basic injection pulse TP is multiplied by the learning value KG. The learning value KG is set based on the learning values ADP1-ADP3 each calculated as the average value of the air-fuel ratio feedback correction coefficient λFB for each injection time number NS.

Even when the injector 21 is driven with the injection pulse TAU having the same length, the actual fuel injection quantity changes if the invalid injection time changes. The change of the actual fuel injection quantity is reflected in the difference between the target air-fuel ratio and the actual air-fuel ratio. If the learning values ADP1-ADP3 are calculated by using the air-fuel ratio feedback correction coefficients λFB of the respective injection time numbers NS in the air-fuel ratio feedback control and if the injection pulse TAU is calculated by the multiplication using the learning value KG set based on the learning values ADP1-ADP3, the injection pulse TAU compensates the change in the invalid injection time. Therefore, even when the invalid injection time changes, the change can be absorbed.

In S190, the injector 21 is driven according to the injection pulse TAU calculated in S180. At that time, if the division number NS calculated in S130 is 2 or larger, the injection pulse TAU calculated in S180 is divided equally by the division number NS or is divided at predetermined ratios according to the division number NS. The divided injections of the fuel are performed from the injector 21 according to the divided injection pulses.

Next, the processing for calculating the learning values ADP1-ADP3 for the respective injection time numbers NS will be explained based on the flowchart of FIG. 5. The processing shown in the flowchart of FIG. 5 is repeatedly performed at every predetermined crank angle.

In S210, the division number NS (injection time number) at the time when the fuel is injected is calculated in the same way as S130. In following S220, it is determined whether the division number NS is 1.

If the division number NS is 1, the process proceeds to S230, in which it is determined whether the previous division number NS(I−1) is 2 or 3. If it is determined that the previous division number NS(I−1) is 2 or 3 in S230, in order to store an integration value IFB and an integration time number CFB of the air-fuel ratio feedback correction coefficient λFB calculated while the division number is 2 or 3, the process proceeds to processing of S320, without performing processing of S240 and S250 explained later.

If it is determined that the previous division number NS is neither 2 nor 3 in S230, the process proceeds to S240. In S240, integration processing of the air-fuel ratio feedback correction coefficient λFB, which is calculated in the air-fuel ratio feedback control, is performed. That is, the air-fuel ratio feedback correction coefficient λFB is added to the variable IFB indicating the integration value to update the variable IFB. In following S250, the time number of the integration of the air-fuel ratio feedback correction coefficient λFB is counted using a counter CFB. The processing of S240 and S250 is repeatedly performed as long as the operation state of the engine 11, in which the division number NS of the fuel injection is 1, continues.

If the operation state of the engine 11 changes and it is determined in S220 that the division number NS is not 1, the process proceeds to processing of S260. In S260, it is determined whether the previous division number NS(I−1) is 1. If it is determined that the previous division number NS(I−1) is 1, the process proceeds to S270. In S270, the learning value ADP1 corresponding to the division number NS (injection timing number), which is 1, is calculated by dividing the integration value IFB of the air-fuel ratio feedback correction coefficient λFB by the integration time number CFB. In S280, the calculated learning value ADP1 is stored in a nonvolatile memory.

In S290, both of the variable IFB, which indicates the integration value, and the counter CFB, which indicates the integration time number, are reset to 0. Thus, the integration of the air-fuel ratio feedback correction coefficient λFB and the counting of the integration time number in the case of the division number NS calculated this time can be performed by using the variable IFB and the counter CFB. The variable and the counter may be prepared individually for the respective division numbers NS.

In this way, the learning value ADP1 is calculated as the average value of the air-fuel ratio feedback correction coefficient λFB in the air-fuel ratio feedback control performed while the division number NS is 1. Thus, an error in the learning value ADP1 can be reduced.

When a new learning value ADP1 is calculated in the state where the learning value ADP1 has been already calculated and stored, a product of the new and old learning values ADP1 is stored as the new learning value ADP1.

Processing from S320 to S390 calculates the learning value ADP2 corresponding to the division number NS when the division number NS is 2. Processing from S420 to S490 calculates the learning value ADP3 corresponding to the division number NS when the division number NS is 3. Each processing is similar to the processing from S220 to S280 that calculates the learning value ADP1 corresponding to the division number NS, which is 1, and therefore not explained in detail here.

However, it should be noted that it is determined in S330 whether the previous division number NS(I−1) is 3. It is because, when the previous division number NS(I−1) is 1, the learning value ADP1 corresponding to the division number NS, which is 1, has been calculated and the variable IFB and the counter CFB have been reset by the processing from S260 to S290 described above. For the similar reason, when the division number NS is 3, the integration of the air-fuel ratio feedback correction coefficient λFB (in S440) and the counting of the integration time number (in S450) are performed without determining the value of the previous division number NS(I−1).

Second Embodiment

Next, a fuel injection device of an internal combustion engine according to a second embodiment of the present invention will be explained. The entire construction of the internal combustion engine control system including the fuel injection device according to the present embodiment is similar to the first embodiment and is not explained in detail here.

In the above-described first embodiment, each of the learning values ADP1-ADP3 is calculated from the average value of the air-fuel ratio feedback correction coefficient λFB for each fuel injection division number NS. In the second embodiment, each of learning values ADPP1-ADPP3 is calculated using a deviation pulse EP, which indicates a fuel deviation of the fuel injection quantity from a basic fuel injection quantity at the time when the air-fuel ratio feedback control is performed.

The fuel injection quantity at the time when the air-fuel ratio feedback control is performed is the fuel quantity including the air-fuel ratio feedback correction amount, which is for conforming the actual air-fuel ratio to the target air-fuel ratio. When the fuel quantity differs from the basic fuel injection quantity, it can be regarded that the fuel deviation is caused by the change in the invalid injection time of the injector 21. Therefore, the learning values ADPP1-ADPP3 can be calculated by using the invalid injection time.

Each of the learning values ADPP1-ADPP3 calculated in this way is equivalent to the invalid injection time of the injector 21. Therefore, the injection pulse TAU is calculated by adding each of the learning values ADPP1-ADPP3 to the basic injection pulse TP differently from the case of the learning values ADP1-ADP3 of the first embodiment, in which the injection pulse TAU is calculated by multiplying the basic injection pulse TP by each of the learning values ADP1-ADP3.

Figure 6:
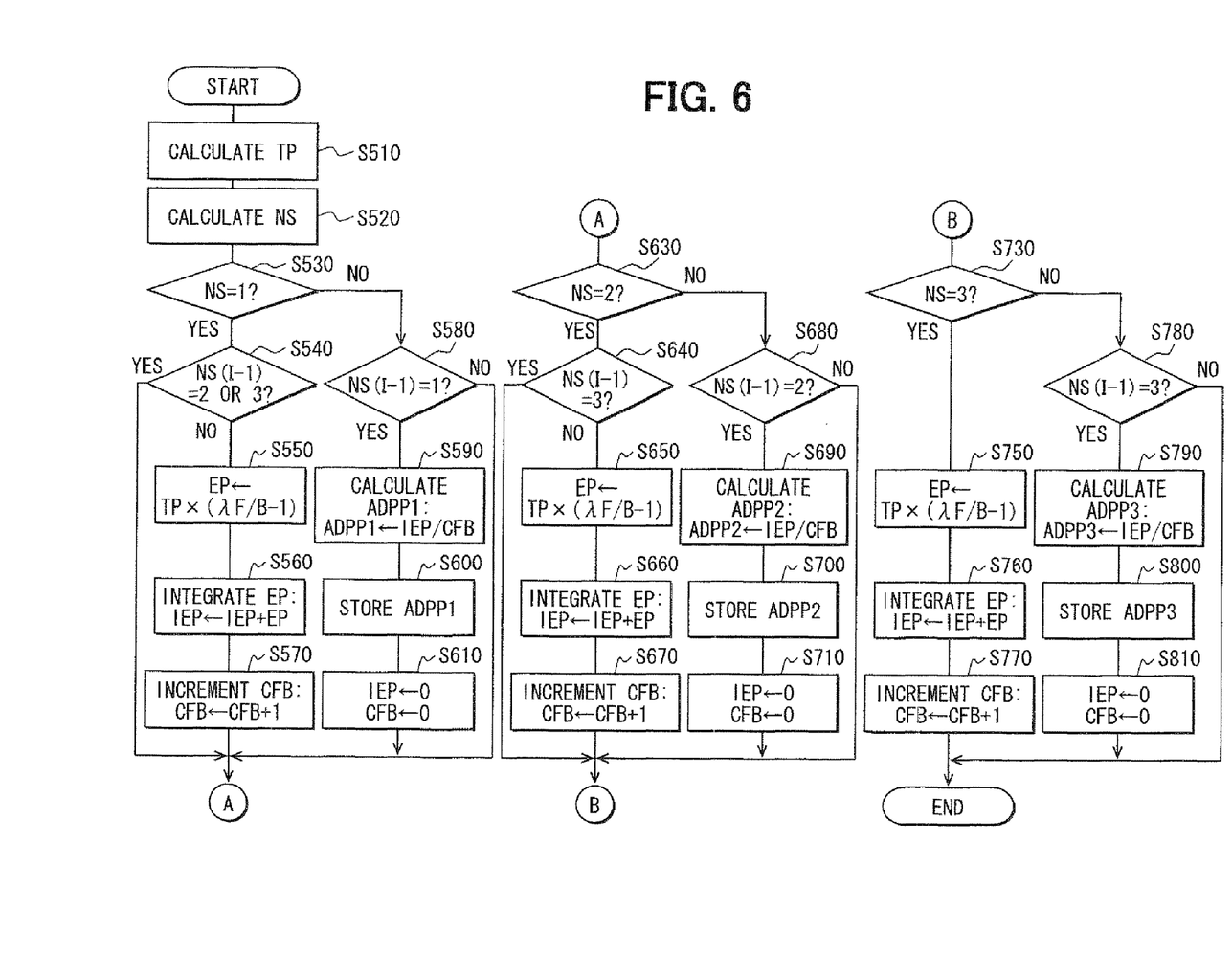
FIG. 6 is a flowchart showing processing for calculating a learning value for each injection division number according to a second embodiment of the present invention.

Next, processing according to the present embodiment for calculating the learning values ADPP1-ADPP3 for the respective injection division numbers NS (injection time numbers) will be explained based on a flowchart of FIG. 6. The processing shown in the flowchart of FIG. 6 is repeatedly performed at every predetermined crank angle.

First, the basic injection pulse TP is calculated in S510. In following S520, the division number NS (injection time number) at the time when the fuel is injected is calculated. In following S530, it is determined whether the division number NS is 1.

If the division number NS is 1, the process proceeds to S540, in which it is determined whether the previous division number NS(I−1) is 2 or 3. If it is determined in S540 that the previous division number NS(I−1) is 2 or 3, in order to store an integration value IEP and an integration time number CFB of the pulse deviation EP calculated while the division number NS is 2 or 3, the process proceeds to S630 without performing processing from S550 to S570 explained later.

If it is determined that the previous division number NS(I−1) is neither 2 nor 3, the process proceeds to S550. In S550, the pulse deviation EP is calculated by multiplying the basic injection pulse TP by a value, which is calculated by subtracting 1 from the air-fuel ratio feedback correction coefficient λFB calculated in the air-fuel ratio feedback control. Thus, the basic injection pulse TP equivalent to the basic fuel injection quantity is subtracted from the pulse equivalent to the fuel quantity including the feedback correction amount, which is calculated by multiplying the basic injection pulse TP by the feedback correction coefficient λFB. Therefore, the above calculation result is the deviation pulse EP indicating the fuel deviation of the fuel injection quantity from the basic fuel injection quantity at the time when the air-fuel ratio feedback control is performed.

In S560, the integration processing of the pulse deviation EP calculated in S550 is performed. That is, the variable IEP indicating the integration value is updated by adding the pulse deviation EP to the variable IEP. In following S570, the time number of the integration of the pulse deviation EP is counted using the counter CFB.

If the operation state of the engine 11 changes and it is determined in S530 that the division number NS is not 1, the process proceeds to processing of S580. In S580, it is determined whether the previous division number NS(I−1) is 1. If it is determined in S580 that the previous division number NS(I−1) is 1, the process proceeds to S590. In S590, the learning value ADPP1 corresponding to the division number NS (injection timing number), which is 1, is calculated by dividing the integration value IEP of the deviation pulse EP by the integration time number CFB. Then, in S600, the calculated learning value ADPP1 is stored in a nonvolatile memory.

In S610, both of the variable IEP, which indicates the integration value, and the counter CFB, which indicates the integration time number, are reset to zero. Thus, the integration of the deviation pulse EP and the counting of the integration time number in the case of the division number NS calculated this time can be performed by using the variable IEP and the counter CFB.

In this way, the learning value ADPP1 is calculated as the average value of the pulse deviation EP calculated from the air-fuel ratio feedback correction coefficient λFB and the basic injection pulse TP in the air-fuel ratio feedback control performed while the division number NS is 1. Thus, an error in the learning value ADPP1 can be reduced.

When a new learning value ADPP1 is calculated in the state where the learning value ADPP1 has been already calculated and stored, the summation of the new and old learning values ADPP1 is stored as the new learning value ADPP1.

Processing from S630 to S710 calculates the learning value ADPP2 corresponding to the division number NS when the division number NS is 2. Processing from S730 to S810 calculates the learning value ADPP3 corresponding to the division number NS when the division number NS is 3. Each processing is similar to the processing from S530 to S600 that calculates the learning value ADPP1 corresponding to the division number NS, which is 1, and therefore not explained in detail here.

It should be noted that it is determined whether the previous division number NS(I−1) is 3 in S640 as in the case of the flowchart of FIG. 5. It is because, when the previous division number NS(I−1) is 1, the learning value ADPP1 corresponding to the division number NS, which is 1, has been calculated and the variable IEP and the counter CFB have been reset by the processing from S580 to S610 described above. For the similar reason, when the division number NS is 3, the calculation of the pulse deviation EP (in S750), the integration of the calculated pulse deviation EP (in S760) and the counting of the integration time number (in S770) are performed without determining the value of the previous division number NS(I−1).

Above is the explanation of the embodiments of the present invention. The present invention is not limited to the embodiments. The present invention may be modified and implemented, for example, as follows.

For example, in the above-described embodiments, the maximum value of the division number NS at the time when the fuel is injected is set at 3. Alternatively, the maximum value may be set at 2, 4 or over. In the above-described embodiments, it is determined that the low rotation range occurs when the engine rotation speed Ne is lower than 3000 rpm. The engine rotation speed Ne for determining the low rotation range may be set arbitrarily.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection device of an internal combustion engine, comprising:
    a booster circuit that boosts a voltage of a battery mounted in a vehicle and stores the boosted voltage in a charge capacitor temporarily;
    an injector that is driven by the boosted voltage, which is stored in the charge capacitor and is applied to the injector, for injecting fuel into a combustion chamber of the internal combustion engine;
    an air-fuel ratio sensor that is provided to an exhaust pipe of the internal combustion engine for measuring an actual air-fuel ratio;
    an operation state sensing means for sensing an operation state of the internal combustion engine;
    a fuel quantity calculating means for calculating a basic fuel quantity to be injected from the injector such that the air-fuel ratio in the internal combustion engine coincides with a target air-fuel ratio according to a sensing result of the operation state sensing means;
    an injection time number deciding means for deciding whether to perform one-time injection or to perform multiple times of divided injections based on the sensing result of the operation state sensing means when the fuel is injected to the internal combustion engine;
    a learning value calculating means for calculating a learning value for correcting the basic fuel quantity individually for each injection time number decided by the injection time number deciding means such that the actual air-fuel ratio approximates to the target air-fuel ratio based on the actual air-fuel ratio sensed with the air-fuel ratio sensor and the target air-fuel ratio; and
    a controlling means for calculating a corrected fuel quantity by correcting the basic fuel quantity, which is calculated by the fuel quantity calculating means, with a learning value corresponding to the injection time number decided by the injection time number deciding means and for driving and controlling the injector according to the injection time number decided by the injection time number deciding means such that the corrected fuel quantity is injected from the injector.

2. The fuel injection device as in claim 1, further comprising:
    an air-fuel ratio feedback controlling means for performing air-fuel ratio feedback control for conforming the actual air-fuel ratio in the internal combustion engine to the target air-fuel ratio, wherein
    the learning value calculating means calculates the learning value by using a feedback correction amount at the time when the air-fuel ratio feedback control is performed by the air-fuel ratio feedback controlling means.

3. The fuel injection device as in claim 2, wherein
    the learning value calculating means calculates an average value of the feedback correction amount of the air-fuel ratio feedback control performed while the injection time number decided by the injection time number deciding means is unchanged as the learning value.

4. The fuel injection device as in claim 1, further comprising:
    an air-fuel ratio feedback controlling means for performing air-fuel ratio feedback control for conforming the actual air-fuel ratio of the internal combustion engine to the target air-fuel ratio, wherein
    the learning value calculating means calculates the learning value by using a deviation of the fuel quantity from the basic fuel quantity at the time when the air-fuel ratio feedback control is performed by the air-fuel ratio feedback controlling means.

5. The fuel injection device as in claim 4, wherein
    the learning value calculating means calculates an average value of the deviation of the fuel quantity from the basic fuel quantity at the time when the air-fuel ratio feedback control is performed while the injection time number decided by the injection time number deciding means is unchanged as the learning value.

* * * * *